United States Patent [19]

Osborn et al.

[11] Patent Number: 4,812,006
[45] Date of Patent: Mar. 14, 1989

[54] FIBER OPTIC CONNECTOR WITH COLLEY RETENTION

[75] Inventors: Glenn M. Osborn, Newtown, Conn.; Robert D. Essert, Poughkeepsie, N.Y.

[73] Assignee: Amphenol Corporation, Wallingford, Conn.

[21] Appl. No.: 554,858

[22] Filed: Nov. 23, 1983

[51] Int. Cl.[4] ............................................. G02B 6/38
[52] U.S. Cl. ............................. 350/96.21; 350/96.20
[58] Field of Search ............... 350/96.20, 96.21, 96.22, 350/96.23

[56] References Cited

U.S. PATENT DOCUMENTS

| | | | |
|---|---|---|---|
| 3,637,284 | 1/1972 | Plyler | 350/96.20 |
| 3,946,467 | 3/1976 | Lukas et al. | 350/96.20 X |
| 4,190,317 | 2/1980 | Makuch | 350/96.20 |
| 4,209,227 | 6/1980 | Dubos et al. | 350/96.22 |
| 4,415,232 | 11/1983 | Caron | 350/96.21 |
| 4,418,983 | 12/1983 | Bowen et al. | 350/96.21 |
| 4,477,146 | 10/1984 | Bowen et al. | 350/96.21 |

OTHER PUBLICATIONS

Hewlett Packard "Optoelectronics Designer's Catalog 1982", pp. 288–293.

Primary Examiner—John D. Lee
Attorney, Agent, or Firm—Bacon & Thomas

[57] ABSTRACT

A retention mechanism for an optical fiber cable connector which includes a compressible collet having an annular flange adjacent its front end and clamping portions adjacent its rear end. The annular flange includes a shoulder which is retained by an internal recess in the rear body portion of the connector to retain the collet in the connector. The clamping portions include inwardly facing shoulders and outwardly inclined walls. The collet is provided with slots adjacent its front and back ends. When the collet is fully inserted into the rear body portion, the shoulders of the clamping portions firmly clamp against the cable and are retained in their compressed state due to the retention of the inclined walls by the inner walls of the rear body portion.

18 Claims, 2 Drawing Sheets

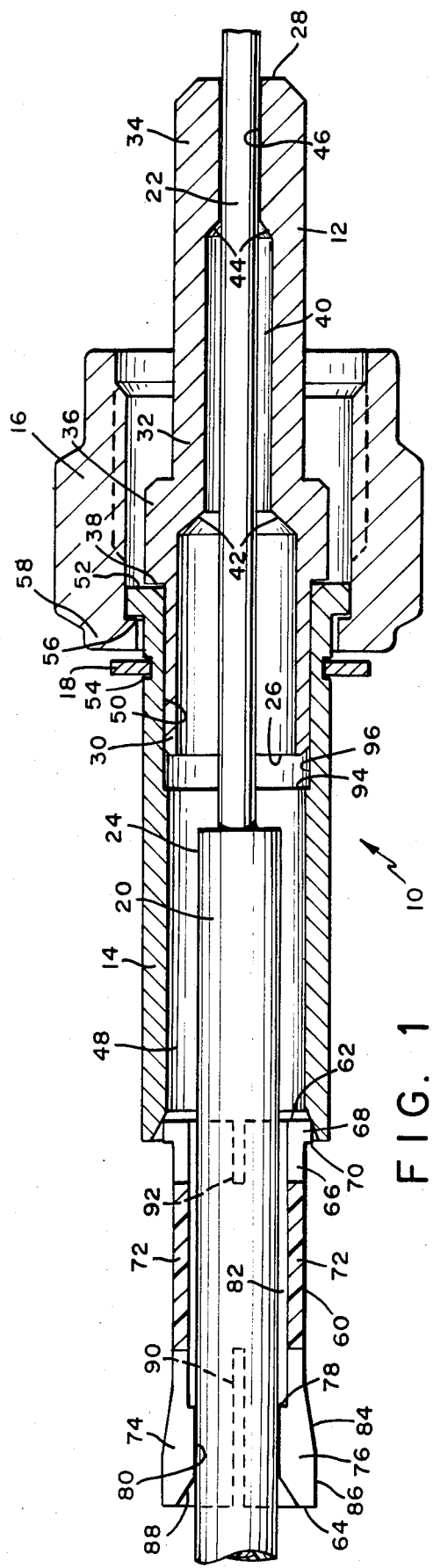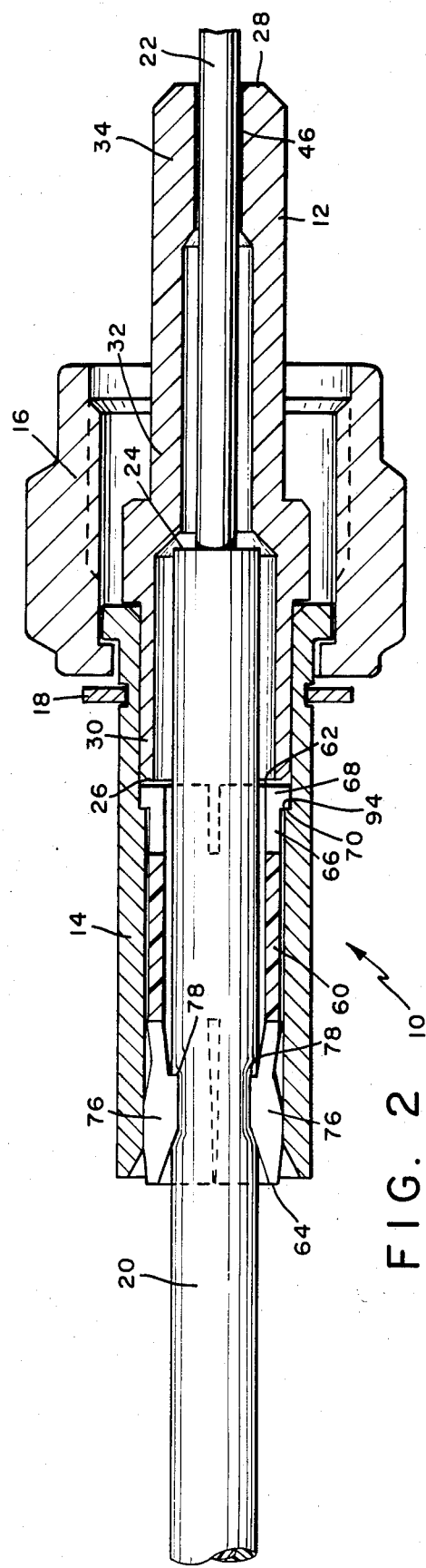

FIBER OPTIC CONNECTOR WITH COLLEY RETENTION

BACKGROUND OF THE INVENTION

1. Field of the Invention

This invention relates to fiber optic and more particularly to a mechanism to retain the optical fiber cable in the connector.

2. Description of the Prior Art

Various means have been proposed and are being utilized to retain an optical fiber cable in a connector. In one technique which is utilized for relatively large optical fibers (e.g., about 1 mm in diameter), the optical fiber cable is inserted into an elongated opening in the connector and an epoxy adhesive is introduced in the space between the cable and the walls which define the opening. The adhesive is then cured at room or elevated temperatures. Although this procedure provides good retention of the cable within the connector, the adhesive is somewhat messy to work with and the cure time can be extended.

Another approach that has been suggested is to use a soft plastic body which surrounds the cable and a metal tube which covers the plastic body. By squeezing the metal tube onto the plastic body, the plastic body is squeezed into the jacket of the cable. This approach requires two separate elements, as well as pressure being directly applied to the cable.

It would be desirable to provide a retention mechanism for an optical fiber cable which did not require an adhesive, which had few parts and which can be easily inserted into the cable.

SUMMARY OF THE INVENTION

In accordance with this invention, there is provided in a connector for an optical fiber cable having a body including a front body portion adapted to receive the optical fiber and a rear body portion adapted to receive the optical fiber cable, a bore extending from the front body portion to the rear body portion and being defined by respective inner walls of the front and rear body portions, and a collet for retaining the optical fiber cable in the rear body portion, the improvement comprising the collet being insertable into the rear body portion and having a front end, a rear end, an exterior surface and an interior bore, the collet comprising retaining means for retaining the collet within the rear body portion when the collet is inserted into the rear body portion and compressible clamping means for clamping against the optical fiber cable to retain the cable within the collet, the clamping means comprising at least one projection extending radially inwardly of the bore of the collet for engagement with the optical fiber cable, and at least one projection extending radially outwardly from the exterior surface of the collet for engagement with the inner walls of the rear body portion, the clamping means being compressed by the inner walls of the rear body portion upon insertion of the collet into the rear body portion, whereby the inwardly extending projection is compressed against the optical fiber cable to retain the cable in a fixed position relative to the collet and within the connector.

Preferably, the retaining means has at least one projection extending radially outwardly of the exterior surface of the collet, and this projection is retained within a recess in the inner wall of the rear body portion to retain the collet in the rear body portion.

This invention provides a retention mechanism for an optical fiber cable which can be easily inserted, does not require an adhesive and has a single part, namely the collet.

BRIEF DESCRIPTION OF THE DRAWINGS

FIG. 1 is a side view of the connector of this invention before insertion of the collet into the body.

FIG. 2 is a side view similar to FIG. 1 but after the collet has been inserted.

DESCRIPTION OF THE PREFERRED EMBODIMENTS

Figure 3:
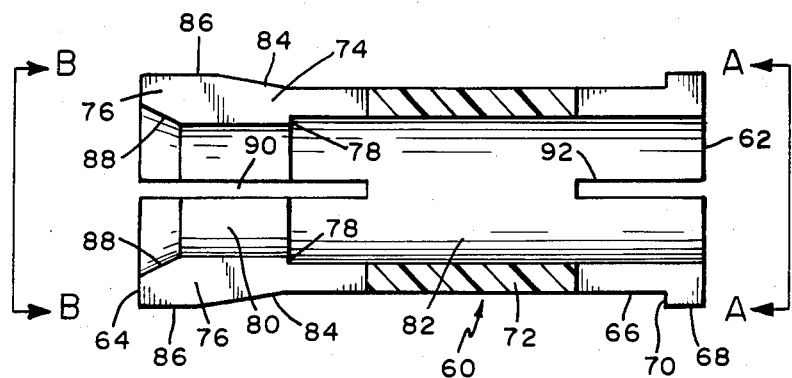
FIG. 3 is a cross-section view of the collet of this invention.

With reference to the drawings, there is shown a connector, generally indicated at 10, which includes a generally cylindrical front body portion 12, a generally cylindrical rear body portion 14, a coupling nut 16 and a retaining ring 18. Connector 10 terminates a fiber optic cable 20, which preferably is of the type which includes a single optical fiber 22 contained within a plastic protective jacket 24.

Front body portion 12 has a rear end 26, a forward end 28, a rear portion 30, a central portion 32 of reduced diameter and a front portion 34. Between rear portion 30 and central portion 32 is an annular flange 36 having a rearwardly facing annular shoulder 38. Front body portion 12 includes a longitudinal bore 40 which extends into the rear end 26 and is dimensioned to receive optical fiber 22. Bore 40 includes converging conical sidewalls 42 adjacent central portion 32 of front body portion 12, as well as converging conical sidewalls 44 adjacent front portion 34 of front body portion 12. Conical sidewalls 42 serve to guide the optical fiber 22 upon insertion and provide a stop for the protective jacket 24 as is described below. Conical sidewalls 44 serve to guide optical fiber 22 through forward end 28 of front body portion 12. Conical sidewalls 44 define the entrance to a reduced diameter bore portion 46 of longitudinal bore 40. Bore 46 is dimensioned such that optical fiber 22 is snugly fit therein. Bore 46 is arranged such that its inner surface is concentric to the outside diameter of front portion 34 to provide the desired concentricity for mating purposes.

Rear body portion 14 is cylindrical in shape and includes a rear bore 48 and a forward bore 50 for tightly receiving rear portion 30 of front body portion 12. Rear body portion 14 has a forward annular face 52 which abuts rearwardly facing shoulder 38 of annular flange 36. Rear body portion 14 also has an annular slot 54 which is dimensioned to receive retaining ring 18 to fix the retaining ring axially therein. An annular flange 56 is provided on the forward end of rear body portion 14 which cooperates with retaining ring 18 to confine coupling nut 16 on the forward end of rear body portion 14. Coupling nut 16 has a portion 58 which is confined between retaining ring 18 and annular flange 56.

Coupling nut 16 is provided with inner threads (not shown) in a conventional fashion for mating with a complimentary connector, which may include an alignment sleeve, or an optical device.

Connectors having the above described features in general are known and a similar connector is described, for example, in U.S. Pat. No. 4,190,317 to Makuch.

In accordance with this invention, a collet 60 is provided to retain fiber optic cable 20 within rear body portion 14. Collet 60 is formed of a suitable material, preferably a resilient plastic such as an acetal resin. As best seen in FIG. 3, collet 60 has a generally tubular configuration and includes a front end 62, a rear end 64, a front portion 66 including an annular flange 68 having a rearwardly extending shoulder 70, a central portion 72 and a rear portion 74. The diameter of central portion 72 is chosen so as to snugly fit within bore 48. Rear portion 74 of collet 60 is provided with a plurality of engaging clamping portions 76 to grip and hold fiber optic cable 20. Clamping portions 76 include inwardly facing shoulders 78 adjacent to central portion 72 and a bore 80 of reduced diameter compared with the central bore 82 of collet 60. The exterior of clamping portions 76 have outwardly extending conical walls 84 which terminate in straight sections 86. Adjacent the rear end 64 of collet 60, the interior wall is provided with a conical inclined wall 88 which extends to bore 80.

Figure 4:
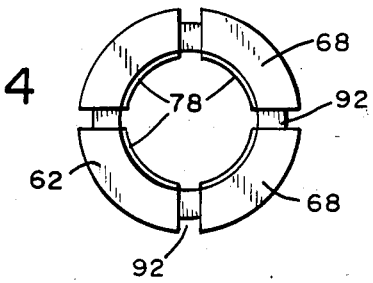
FIG. 4 is an end view of the collet of FIG. 3 taken along line A—A.
Figure 5:
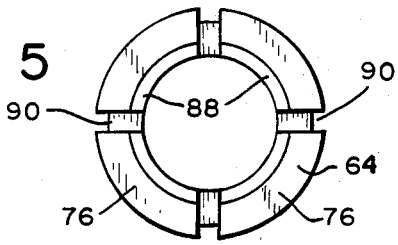
FIG. 5 is an end view of the collet of FIG. 3 taken along line B—B.

A plurality of slots 90 are provided in the exterior wall of collet 60 adjacent to its rear portion 74, with slots 90 extending from rear end 64 beyond shoulder 78 to central portion 72. As shown in FIG. 5, these slots divide the end of collet 60 into separate clamping portions from a single flange member. Similarly, a plurality of slots 92 extend from front end 62 rearwardly to central portion 72. As shown in FIG. 4, these slots divide annular flange 68 into separate retaining portions. Slots 90 and 92 are provided to assist in the compression of collet 60 as it is inserted into rear body portion 14 of connector 10 as is described below.

Forward bore 50 of rear body portion 14 has a diameter greater than rear bore 48 and terminates in a forwardly extending shoulder 94 which is spaced from rear end 26 of front body portion 12. This space provides a recess 96 which accommodates annular flange 68 of collet 60.

Preferably, fiber optic cable 20 includes a single optical plastic fiber 22 having an integral plastic cladding (not shown) and a plastic protective jacket 24; the optical fiber 22 may have a diameter of, for example, about 1 mm. In order to terminate fiber optic cable 20 in connector 10, the plastic protective jacket 24 is stripped away from the forward portion of the cable. Collet 60 is then slipped over cable 20 following which the front end of cable 20 is inserted into connector 10. The walls surrounding bore 80 of collet 60 grip the outer plastic jacket 24 of fiber optic cable 20 such that the collet moves forwardly with insertion of the cable. Optical fiber 22 is guided by inclined conical walls 42 into front bore 40 as cable 20 is inserted into the connector, and inclined conical walls 44 provide further guiding of optical fiber 22 into front bore 46. The length of stripping of jacket 24 from optical fiber 22 is chosen such that the fiber 22 extends outwardly from the front end 28 of front body portion 12. At this point, the front end of protective jacket 24 is spaced from front body portion 12.

Collet 60 is then pressed into rear bore 48 of rear body portion 14. This may be achieved manually or by a suitable tool. As collet 60 is pressed into rear bore 48, annular flange 68, having an outer diameter somewhat larger than the diameter of bore 48, is compressed inwardly. This is permitted due to the resiliency of the collet material as well as the presence of slots 92. As collet 60 is inserted further into rear bore 48, clamping portions 76 are also inwardly compressed since their outer diameter is also greater than that of bore 48. When collet 60 is fully inserted into rear bore 48, flange 68 is seated in the opening between end 26 and inner bore 48, with flange 68 having been expanded from its reduced, compressed diameter. The front end of protective jacket 24 abuts against inclined conical walls 42. At the rear end of collet 60, clamping portions 76 are compressed against jacket 24 of cable 20, with shoulders 78 and the walls of bore 80 tightly gripping jacket 24. Clamping portions 76 are retained in their compressed state by the inner wall of bore 48. Shoulder 94 of forward bore 50 retains collet 60 in a fixed axial position due to its engagement with shoulder 70 of annual flange 68.

The front end of optical fiber 22 is then prepared for interconnection in a conventional manner, which may include cleaving the excess end material and polishing the end to a desired smoothness.

In the above manner, cable 20 can be tightly clamped and retained within connector body 10 by means of collet 60, avoiding the use of adhesive materials as well as multipart clamping mechanisms. Collet 60 is permanently retained in body 10 due to the engagement of shoulders 70 by shoulders 94.

Although in the foregoing description reference has been made to a fiber optic cable having a single optical fiber and a protective jacket, this invention is also suitable for use with fiber optic cable which includes strength fibers and additional jackets. To accommodate this type of cable, the outer layers are stripped back to a position rearward of rear body portion 14 in the final inserted position of the cable. The optical fiber is preferably a plastic fiber, but may alternatively be a glass fiber.

As can be seen, collet 60 slides smoothly into rear body portion 14 and is permanently retained within rear body portion 14. As a result, cable 20 is permanently clamped within connector 10. Although collet 60 is preferably formed of plastic, it may alternatively be formed of metal.

The number and spacing of slots 90, 92 may be varied as desired to obtain the desired compressibility and retention of annular flange 68 and cable 20 by clamping portions 76.

What is claimed:

1. In a connector for an optical fiber cable having a body including a front body portion adapted to receive the optical fiber and a rear body portion adapted to receive the optical fiber cable, a bore extending from the front body portion to the rear body portion and being defined by respective inner wall of the front and rear body portions, and a collet for retaining the optical fiber cable in the rear body portion, the improvement comprising:

said collet being insertable into said rear body portion and having a front end, a rear end, an exterior surface and an interior bore, said collet comprising retaining means for retaining said collet within said rear body portion when said collet is inserted into said rear body portion and compressible clamping means for clamping against said optical fiber capable to retain the cable within said collet, said clamping means comprising a plurality of wedge-shaped clamping portions adjacent to said rear end of said collet, each of said clamping portions including a projection extending radially inwardly of said bore of said collet for engagement with said optical fiber cable, and each of said clamping portions including a projection extending radially outwardly from said exterior surface of said collet for engagement with said inner walls of said rear body portion, said clamping means being compressed by said inner walls of said rear body portion upon insertion of said collet into said rear body portion, whereby said inwardly extending projection is compressed against said optical fiber cable to retain said cable in a fixed position relative to said collet and within said connector.

2. The connector of claim 1 wherein said retaining means comprises at least one projection extending radially outwardly from said exterior surface of said collet.

3. The connector of claim 2 wherein said retaining means is located adjacent the front end of said collet.

4. The connector of claim 3 wherein said retaining means includes a plurality of said outwardly extending projections.

5. The connector of claim 1 wherein each of said inwardly extending projections of said clamping means includes a shoulder portion for engagement with said optical fiber cable.

6. The connector of claim 1 wherein each of said outwardly extending projections of said clamping means comprises an outwardly inclined surface.

7. The connector of claim 1 including at least one slot in said exterior surface of said collet adjacent said clamping means.

8. The connector of claim 1 including at least one slot in said exterior surface of said collet adjacent said retaining means.

9. The connector of claim 1 including a recess in said inner wall of said rear body portion adjacent to the rear end of said front body portion, said recess adapted to receive said retaining means to retain said collet within said rear body portion.

10. The connector of claim 9, wherein said retaining means is located at the front end of said collet and comprises at least one projection extending radially outwardly from said exterior surface of said collet, said outwardly extending projection being received in said recess when said collet is fully inserted into said rear body portion.

11. The connector of claim 10 wherein said retaining means includes a plurality of said outwardly extending projections which are separated by slots in said front end of said collet.

12. The connector of claim 1 wherein said collet has a generally tubular configuration, said retaining means being located at the front end of said collet and including at least one projection extending outwardly of said exterior surface of said collet.

13. The connector of claim 12 including a plurality of outwardly extending projections of said retaining means, and a plurality of slots in said exterior surface of said collet adjacent to said retaining means and to said clamping means.

14. The connector of claim 1 wherein said optical fiber cable includes an inner optical fiber and an outer protective jacket, said bore of said body having a reduced diameter within the front end of said front body portion to receive the inner optical fiber, and said bore of said body within said rear body portion having a diameter sufficient to receive said cable including said outer protective jacket.

15. The connector of claim 14 wherein each of said inwardly extending projections of said clamping means includes a shoulder portion for engagement with said outer protective jacket of said optical fiber cable.

16. The connector of claim 15 wherein each of said outwardly extending projections have an outwardly inclined surface terminating in a generally straight portion adjacent said rear end of said collet.

17. In a connector for an optical fiber cable having an inner optical fiber and an outer protective jacket, said connector having a body including a front body portion adapted to receive the optical fiber and a rear body portion adapted to receive the optical fiber cable, a bore extending from the front body portion to the rear body portion and being defined by respective inner walls of the front and rear body portions, and a collet for retaining the optical fiber cable in the rear body portion, the improvement comprising:

said collet being compressible and being insertable into said rear body portion, said collet having a front end, a rear end and a generally tubular configuration defined by an exterior surface and an interior bore, said collet comprising compressible retaining means for retaining said collet within said rear body portion when said collet is fully inserted into said rear body portion, compressible clamping means for clamping against said protective jacket of said optical fiber cable when said collet is fully inserted into said rear body portion to retain the cable within said collet, and a plurality of slots in said exterior surface of said collet adjacent said retaining means and said clamping means, said retaining means comprising a plurality of projections extending radially outwardly of said exterior surface of said collet adjacent to said front end of said collet, a shoulder portion on each of said projections, said rear body portion including a recess in its inner wall adjacent to the rear end of said front body portion, said recess adapted to receive said plurality of said projections to permanently retain said collet within said rear body portion, said clamping means comprising a plurality of wedge-shaped clamping portions adjacent to said rear end of said collet, each of said clamping portions including a shoulder portion extending radially inward of said interior bore of said collet, and each of said clamping portions including an outer wall including an outwardly inclined section terminating in a generally straight section adjacent to said rear end of said collect for engagement with said inner walls of said rear body portion, said clamping means being compressed by said inner walls of said rear body portion upon insertion of said collet into said rear body portion, said shoulder portions being compressed against said outer protective jacket of said optical fiber cable when said collet is fully inserted into said rear body portion, whereby said optical fiber cable is retained in a fixed position relative to said collet and is retained within said connector.

18. The connector of claim 17 including coupling means for coupling said connector to another fiber optic connector or to an optical device, and wherein said collet is formed of a plastic material.

* * * * *